United States Patent [19]
Gargano

[11] Patent Number: 5,913,965
[45] Date of Patent: Jun. 22, 1999

[54] AUTOMATIC BASTER FOR A ROASTING PAN

[76] Inventor: Rinaldo Gargano, 295 Plain Ct., Frankilin Square, N.Y. 11010

[21] Appl. No.: 09/028,683

[22] Filed: Feb. 24, 1998

[51] Int. Cl.[6] .............................. A47J 27/52; A47J 37/00; A47J 37/10
[52] U.S. Cl. ................................................ 99/346; 99/347
[58] Field of Search ..................... 99/345–347, 330–332, 99/339, 340, 352, 355, 402, 400, 426, 448, 450, 516, 534–536; 426/509–511, 523, 438, 439; 118/20, 30, 426; 134/142

[56] References Cited

U.S. PATENT DOCUMENTS

| | | | |
|---|---|---|---|
| 965,636 | 7/1910 | Kautz | 99/346 |
| 1,349,302 | 8/1920 | Spitz | 99/346 |
| 1,471,219 | 10/1923 | Sutton | 99/346 |
| 2,400,405 | 5/1946 | Getgey et al. | 99/346 |
| 3,311,048 | 3/1967 | Pickering | 99/346 |
| 3,713,378 | 1/1973 | West et al. | 99/346 |
| 3,908,532 | 9/1975 | Underwood | 99/419 X |
| 3,922,960 | 12/1975 | Lewis | 99/345 X |
| 3,958,504 | 5/1976 | Levin | 99/426 |
| 4,066,010 | 1/1978 | Larsson | 99/346 |

*Primary Examiner*—Timothy F. Simone
*Attorney, Agent, or Firm*—Michael I. Kroll

[57] ABSTRACT

An automatic baster (10) for a roasting pan (12) comprising a component (24) for elevating meat (14) slightly above the bottom (26) of the roasting pan (12). An assembly (27) on the elevating component (24) is for raising juices and gravy (28) from the bottom (26) of the roasting pan (12) over the meat (14) during the roasting of the meat (14), when the roasting pan (12) is placed on a rack (16) within an oven (19) of a stove (20) with the oven door (15) closed. A facility (30) on the juices and gravy raising assembly (27) is for dropping the juices and gravy (28) gently downwardly upon the meat (14) in a continuous manner, so as to keep the meat (14) moist, retain its flavor and make it more tasty after being roasted.

1 Claim, 4 Drawing Sheets

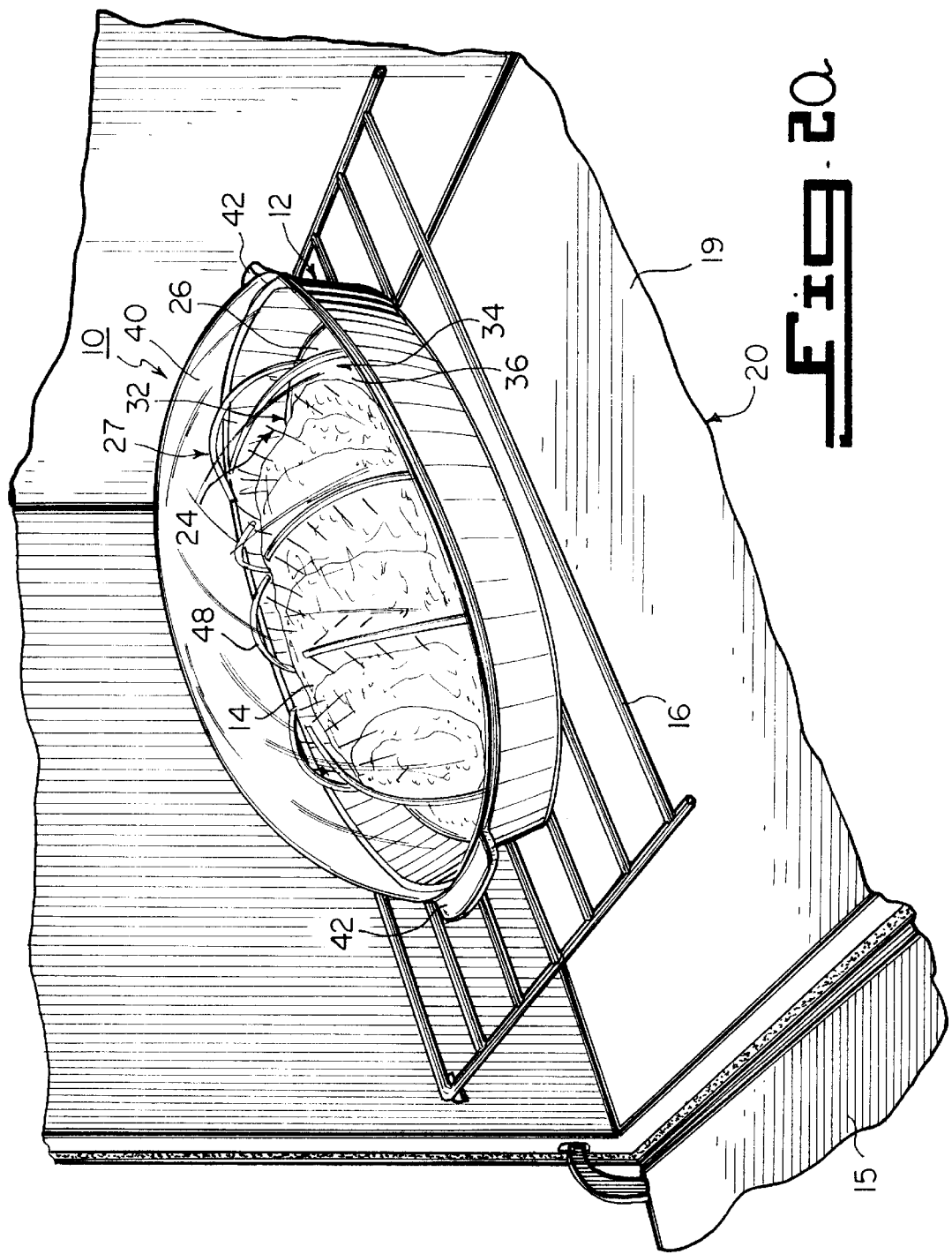

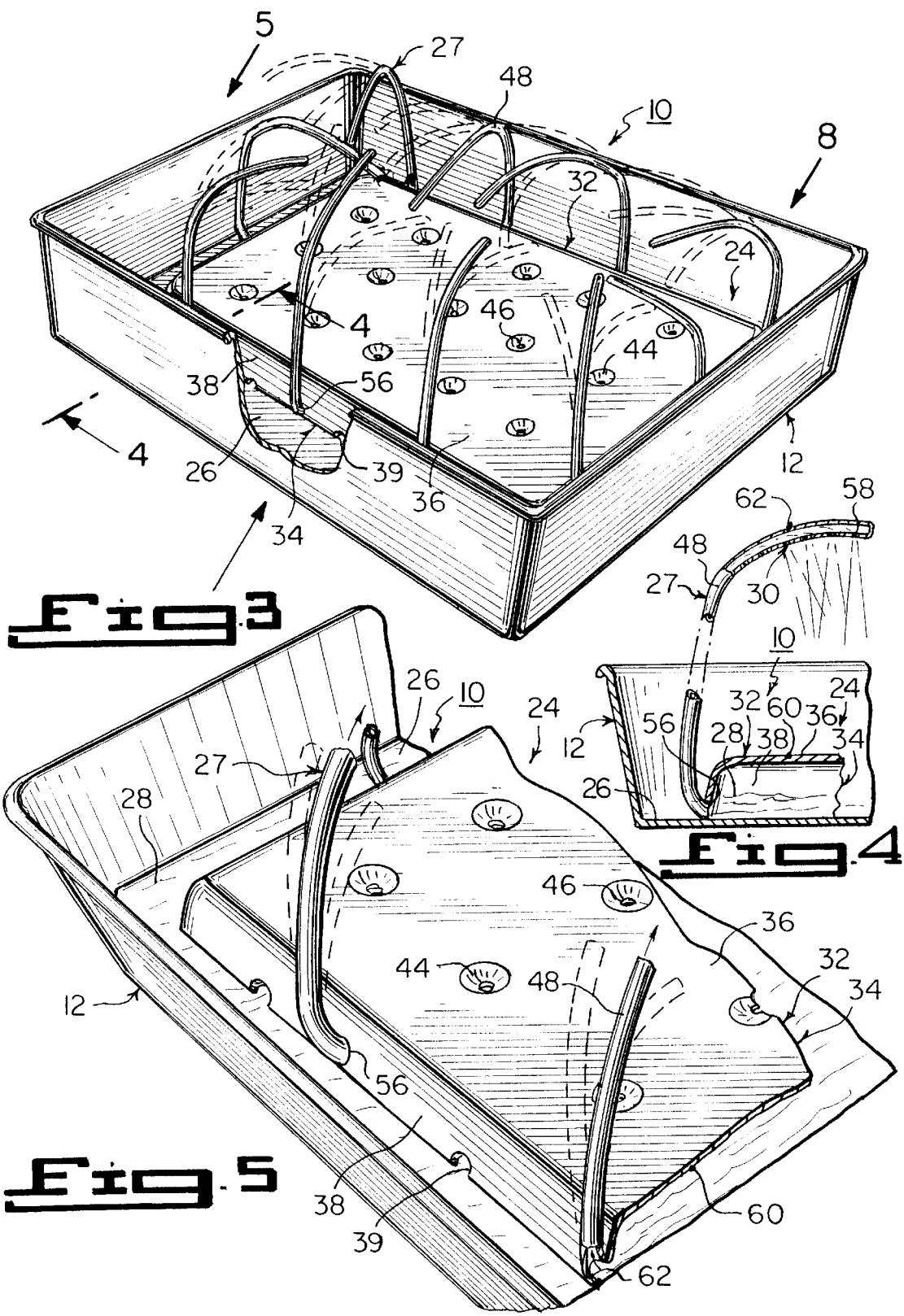

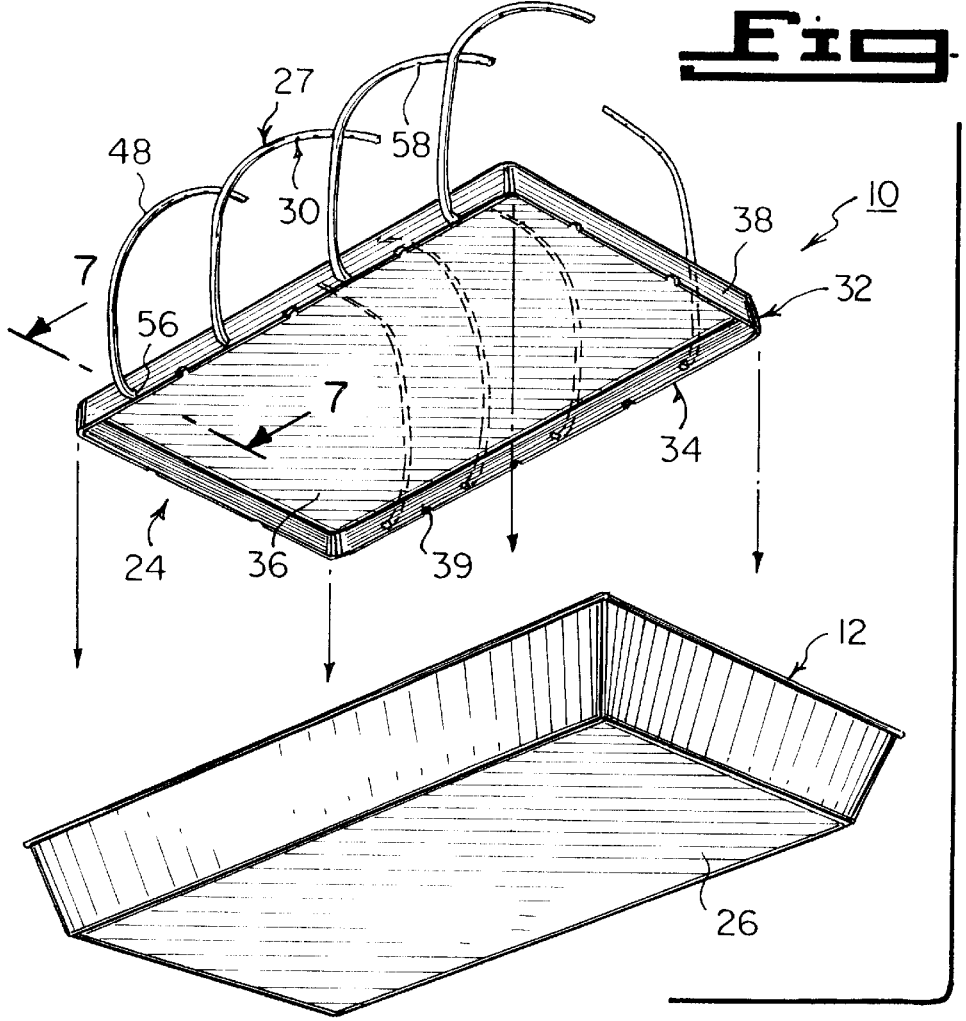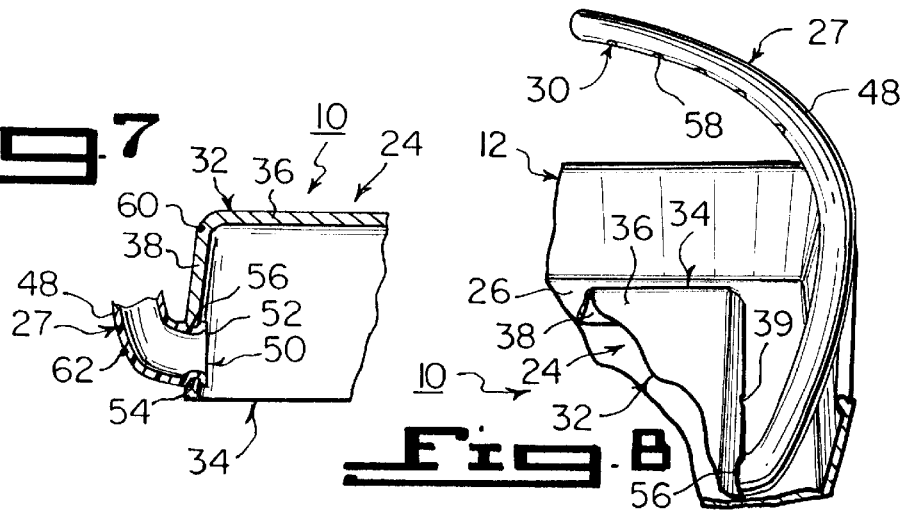

AUTOMATIC BASTER FOR A ROASTING PAN

BACKGROUND OF THE INVENTION

1. Field of the Invention

The instant invention relates generally to culinary equipment and more specifically it relates to an automatic baster for a roasting pan that bastes meat or fowl in a continuous manner in the roasting pan without any attention from a cook during the roasting operation. This allows the cook to attend to other things. The juices and gravy on the bottom of the roasting pan will be lifted above the meat or fowl and then be gently dropped downwardly upon the meat or fowl in a continuous manner. The meat or fowl will not become dried out, thereby retaining the flavor and making it more tasty.

2. Description of the Prior Art

Numerous culinary equipment have been provided in prior art. For example, U.S. Pat. No. 3,713,378 to West el al.; U.S. Pat. No. 3,908,532 to Underwood; U.S. Pat. No. 3,958,504 to Levin and U.S. Pat. No. 4,066,010 to Larsson all are illustrative of such prior art. While these units may be suitable for the particular purpose to which they address, they would not be as suitable for the purposes of the present invention as heretofore described.

WEST, DEXTER F.

WEST, JOSEPH W.

BASTER AND TENDERIZER

U.S. Pat. No. 3,713,378

A culinary tool for improving the taste of roasting meats and fowl. The device comprising an elongated stem of tubular material which is threaded externally at both ends thereof. The stem being first threadingly secured at one end to a steam pocket plate, while the other end of the stem is threadingly engaged to a pointed head or key to permit inserting the stem through a fowl or meat intended to be roasted. After which, the key or head is removed and replaced by a basting plate. During roasting operation, the steam pocket plate is seated in the gravy at the bottom of the roasting pan. The gravy is pushed upwardly through the stem upon the basting plate. The gravy drips downwardly on top of the fowl or meat so to baste the same and preventing it from drying up, thus producing a tender and tasty food.

UNDERWOOD, PAUL W.

AUTOMATIC BASTER COOKER

U.S. Pat. No. 3,908,532

Automatic baster cooker in which meat roasts, fowl and the like are cooked rapidly and economically and basted automatically, with substantial reduction in shrinkage in comparison with cooking and roasting in usual manners. The automatic baster cooker utilizes a roaster vessel or cooking receptacle provided with a close-fitting lid. The meat or fowl is placed in the roaster vessel, and disposed thereover. A deflector plate is provided which carries a plurality of perforated elongated spikes or tubular members which penetrate into the body of the meat roast or fowl and extend downwardly into the meat. A liquid which serves as a source of steam or flavoring vapors is disposed in the bottom of the roaster vessel. When the latter is heated, the vapors or steam serve to aid in cooking the meat roast or fowl, some passing through the perforations in the spikes or tubular members directly into the body of the meat roast or fowl, and others striking the deflector plate and condensing and flowing over the outer surface of the meat roast or fowl automatically and essentially continuously to baste the same.

LEVIN, MYRON M.

ROASTING PAN

U.S. Pat. No. 3,958,504

A roasting pan formed of an aluminum foil, in which the base or bottom of the pan is integrally formed to provide spaced upwardly extending projections having rounded top surfaces. The spaced projections form in effect a rack upon which a food product to be roasted is placed. The product which rests on the upwardly extending projections has minimal contact therewith and elevates the roasting product from the bottom of the pan to permit the liquids, juices and the like, to flow unimpeded around the bottom of the pan. It eliminates the resting of the roasting product in any juices or grease from the roasting product which would otherwise be absorbed by it. By providing the upwardly extending projections as an integral part of the base, the use of a separate roasting rack is eliminated.

LARSSON, KIM

AUTOMATIC BASTER

U.S. Pat. No. 4,066,010

Automatic basting apparatus including an inverted U-shaped standard positioned in a roasting pan partially filled with water. The legs of the standard are hollow, as well as the bight portion. Holes are provided in the bight portion to dispense condensed steam on meat or fowl roasted in the pan. As the water in the pan boils, it rises through the legs and condenses in the bight portion and is passed through the holes to provide a continuous basting action. The legs of the standard are split and connected by tubular sleeves to adjust the height of the bight portion relative to the food being roasted.

SUMMARY OF THE INVENTION

A primary object of the present invention is to provide an automatic baster for a roasting pan that will overcome the shortcomings of the prior art devices.

Another object is to provide an automatic baster for a roasting pan that will baste meat or fowl in a continuous manner in the roasting pan without any attention from a cook during the roasting operation, so as to allow the cook to attend to other things.

An additional object is to provide an automatic baster for a roasting pan wherein the juices and gravy on the bottom of the roasting pan will be lifted above the meat or fowl being roasted and then be gently dropped downwardly upon the meat or fowl in a continuous manner, so that the meat or fowl will not become dried out, thereby retaining the flavor and making it more tasty.

A further object is to provide an automatic baster for a roasting pan that is simple and easy to use.

A still further object is to provide an automatic baster for a roasting pan that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2a is a second embodiment of the present invention in another type of roasting pan automatically basting a meat roast in an oven.

FIG. 3 is a perspective view of the first embodiment in the roasting pan without the fowl, with part of the roasting pan broken away and in section.

FIG. 4 is a cross sectional view taken along line 4—4 in FIG. 3.

FIG. 5 is an enlarged perspective view taken in the direction of arrow 5 in FIG. 3, with parts broken away and in section.

FIG. 6 is a bottom perspective view of the first embodiment exploded from the roasting pan.

FIG. 7 is a cross sectional view taken along line 7—7 in FIG. 6.

FIG. 8 is an enlarged perspective view taken in the direction of arrow 8 in FIG. 3, with parts broken away and in section.

Similar reference characters denote corresponding features consistently throughout the attached drawings.

DESCRIPTION OF THE PREFERRED EMBODIMENTS

Figure 1:
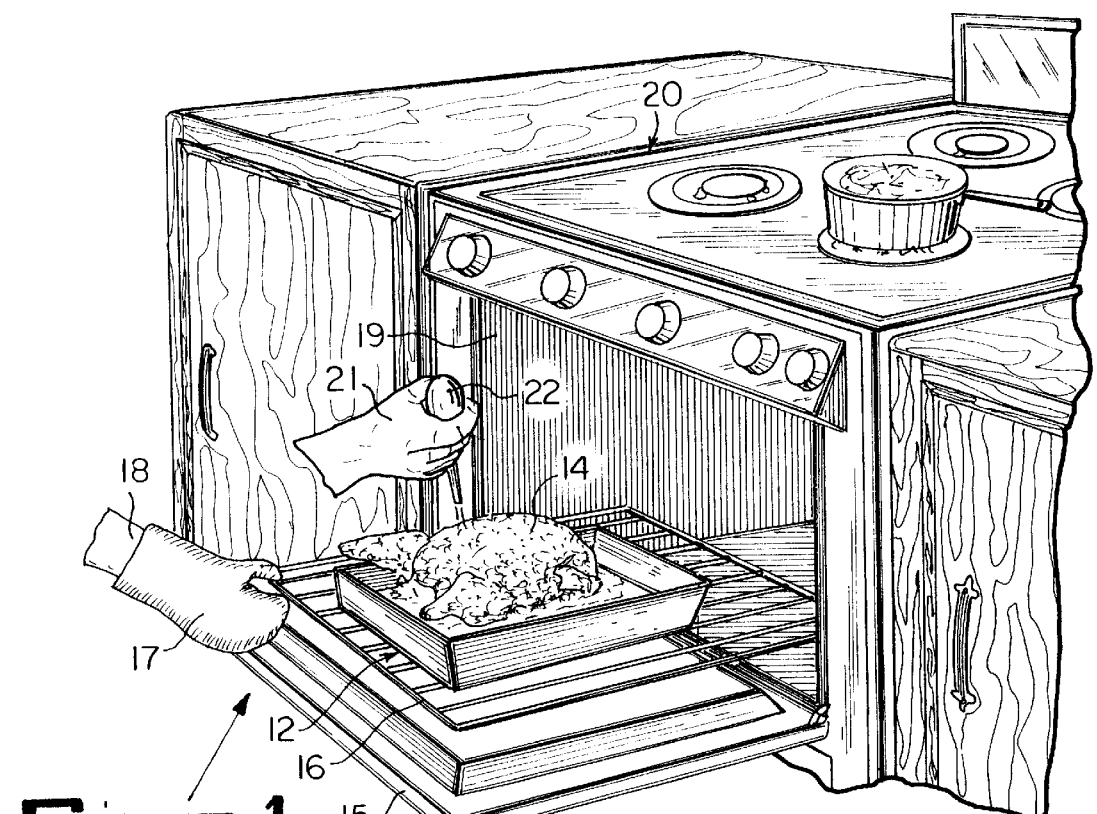
FIG. 1 is a perspective view of the prior art, showing a fowl being basted in the old fashion way in an oven.

Turning now descriptively to the drawings, in which similar reference characters denote similar elements throughout the several views, FIGS. 2 through 8 illustrate the present invention being an automatic baster 10 for a roasting pan 12. With regard to the reference numerals used, the following numbering is used throughout the various drawing figures.
10 automatic baster
12 roasting pan
14 meat
15 oven door of 19
16 rack in 18
17 pot holder mitten
18 first hand of cook
19 oven in 20
20 stove
21 second hand of cook
22 conventional basting tool (prior art)
24 meat elevating component of 10
26 bottom of 12
27 juices and gravy raising assembly of 10
28 juices and gravy
30 juices and gravy dropping facility of 10
32 base for 24
34 inverted tray for 32
36 support surface of 34
38 side wall of 34
39 opening in 38
40 removable lid of 12
42 carry handle on 40
44 indentation in 36
46 hole in 44
48 elongated curved flexible tube of 27
50 fluidly attaching structure of 27
52 collar of 50
54 annular groove in 52
56 aperture in 24
58 small aperture in 48 of 30
60 strong heat resistant durable material (metal) for 34
62 strong heat resistant durable material (plastic) for 48

FIG. 1 shows the prior art which is an old fashioned way of basting meat 14, such as a chicken placed into the roasting pan 12. The cook has to open an oven door 15, pull out a rack 16 with a pot holder mitten 17 worn on a first hand 18 from within an oven 19 in a stove 20. A second hand 21 of the cook utilizes a conventional basting tool 22 to baste the meat 14.

The present invention being the automatic baster 10 for the roasting pan 12 comprises a component 24 for elevating the meat 14 slightly above the bottom 26 of the roasting pan 12. An assembly 27 on the elevating component 24 is for raising juices and gravy 28 from the bottom 26 of the roasting pan 12 over the meat 14 during the roasting of the meat 14, when the roasting pan 12 is placed on the rack 16 within the oven 19 of the stove 20 with the oven door 15 closed. A facility 30 on the juices and gravy raising assembly 27, is for dropping the juices and gravy 28 gently downwardly upon the meat 14 in a continuous manner, so as to keep the meat 14 moist, retain its flavor and make it more tasty after being roasted.

The meat elevating component 24 is a base 32 smaller than the bottom 26 of the roasting pan 12. The base 32 is an inverted tray 34 that includes a support surface 36 and a side wall 38 thereabout. The side wall 38 has a plurality of spaced apart openings 39 at an edge which rests upon the bottom 26 of the roasting pan 12, so as to allow the juices and gravy 28 to pass therethrough.

Figure 2:
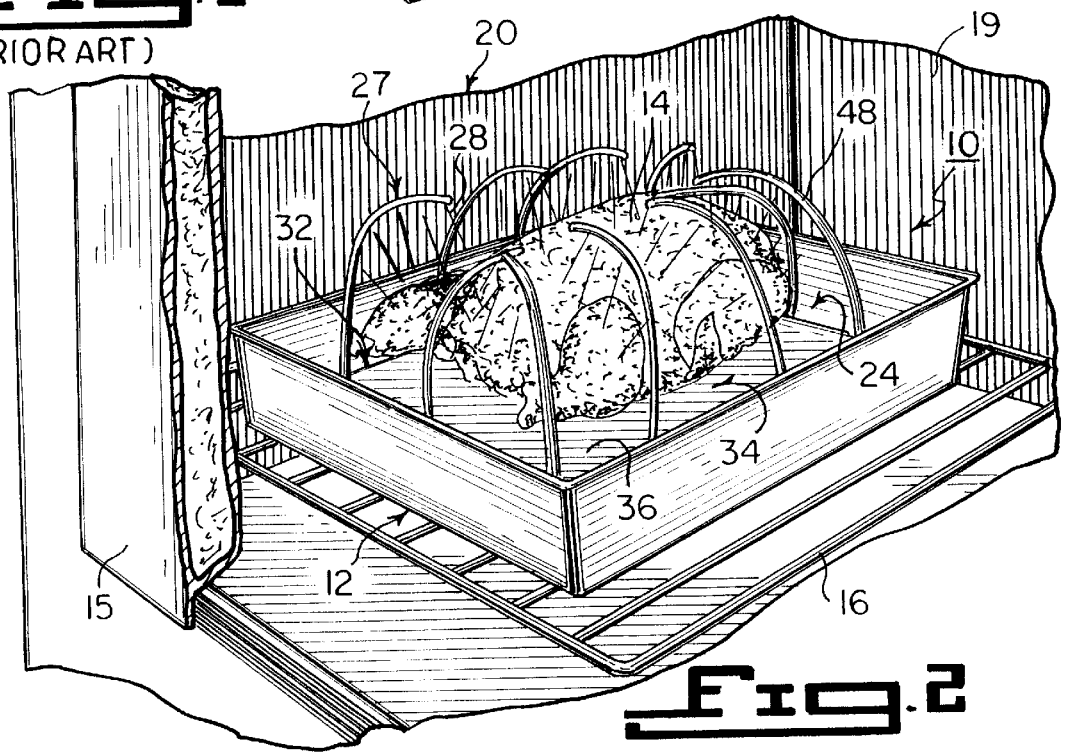
FIG. 2 is a first embodiment of the present invention in a roasting pan automatically basting a fowl in an oven.

The inverted tray 34 is in a geometric shape corresponding to the same geometric shape as the roasting pan 12. The inverted tray 34 in FIGS. 2 and 3 through 8, is rectangular and the roasting pan 12 is also rectangular. In FIG. 2a, the inverted tray 34 is oval and the roasting pan 12 is also oval. The roasting pan 12 in FIG. 2a also has a removable lid 40 with carry handles 42. The inverted tray 34 shown in FIGS. 3 and 5, can further include the support surface 36 having a plurality of spaced apart indentations 44 with holes 46 therethrough, so that the gravy 28 from the meat 14 can flow through the holes 46 and go onto the bottom 26 of the roasting pan 12.

The juices and gravy raising assembly 27 consists of a plurality of elongated curved flexible tubes 48. A structure 50 is for fluidly attaching first ends of the tubes 48 in spaced apart relationships to the meat elevating component 24, so that the tubes 48 will extend upward over and about the meat 14 on the meat elevating component 24.

Each fluidly attaching structure 50, as best seen in FIG. 7, is a collar 52 integrally formed on the first end of the tube 48. The collar 52 has an annular groove 54 thereabout, which fits into an aperture 56 in the meat elevating component 24. The juices and gravy dropping facility 30 includes each tube 48 having a plurality of small apertures 58 adjacent a second end which face toward the meat 14 on the meat elevating component 24, to allow the juices and gravy 28 to pass therethrough.

The inverted tray 34 is fabricated out of a strong heat resistant durable material 60, wherein the strong heat resistant durable material 60 can be metal. Each tube 48 is fabricated out of a strong heat resistant durable material 62, wherein the strong heat resistant durable material 62 can be plastic.

The tubes 48 can be all put in place to the meat elevating component 24 by the fluidly attaching structures 50 for optimum performance. They can be removed to a minimum of one for concentrated results or for minimum bastings. Because the tubes 48 are flexible, the juices and gravy 28 can be directed to the desired locations of basting. The support surface 36 can also be made of a durable material that is permanent, while the tubes 48 can be made of materials that can be discarded.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claim:

1. An automatic baster for a roasting pan comprising:

a) means for elevating meat slightly above the bottom of the roasting pan comprising a base formed from an inverted tray with a support surface and a side wall extending thereabout;

b) means on said elevating means, for raising juices and gravy from the bottom of the roasting pan over the meat during the roasting of the meat, when the roasting pan is placed on a rack within an oven of a stove with the oven door closed;

c) means on said juices and gravy raising means, for dropping the juices and gravy gently downwardly upon the meat in a continuous manner, so as to keep the meat moist, retain its flavor and make it more tasty after being roasted;

d) said side wall having a plurality of spaced apart openings at an edge which rests upon the bottom of the roasting pan to allow juices and gravy to pass through;

e) said support surface having a plurality of spaced apart indentations with holes therethrough to permit juices and gravy from the meat to flow through the holes and go onto the bottom of the roasting pan;

f) said gravy raising means comprising a plurality of flexible and disposable elongated curved flexible tubes and means for fluidly attaching first ends of said tubes in spaced apart relationships to some of said spaced apart openings in said side wall to permit said tubes to extend upward over and about the meat on said elevating means, to permit said tubes to be adjusted to distribute the juices and gravy on the meat where selected;

g) each said flexible tube having a collar integrally formed on the first end of said tube, said collar having an annular groove thereabout which fits into an opening in said side wall permitting said tubes to be replaced after each use;

h) each said tube has a plurality of small apertures adjacent a second end which face toward the meat to allow the juices and gravy to pass therethrough.

\* \* \* \* \*